(12) United States Patent
Denoue et al.

(10) Patent No.: US 8,144,123 B2
(45) Date of Patent: Mar. 27, 2012

(54) DYNAMICALLY CONTROLLING A CURSOR ON A SCREEN WHEN USING A VIDEO CAMERA AS A POINTING DEVICE

(75) Inventors: Laurent Denoue, Palo Alto, CA (US); John E. Adcock, Menlo Park, CA (US); Gene Golovchinsky, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1022 days.

(21) Appl. No.: 11/838,817

(22) Filed: Aug. 14, 2007

(65) Prior Publication Data
US 2009/0046061 A1  Feb. 19, 2009

(51) Int. Cl.
G09G 5/00 (2006.01)
G09G 5/08 (2006.01)
G06F 3/033 (2006.01)
(52) U.S. Cl. .......................... 345/157; 345/156; 345/158
(58) Field of Classification Search .......... 345/156–184, 345/104, 204–215; 178/18.01–20.04; 715/710, 715/711, 856–862
See application file for complete search history.

(56) References Cited

U.S. PATENT DOCUMENTS

| | | | | | |
|---|---|---|---|---|---|
| 5,515,079 | A | * | 5/1996 | Hauck | 345/157 |
| 7,057,602 | B2 | * | 6/2006 | Tani et al. | 345/157 |
| 7,586,481 | B1 | * | 9/2009 | Paquette et al. | 345/157 |
| 7,598,941 | B2 | * | 10/2009 | Leuder et al. | 345/157 |
| 7,683,881 | B2 | * | 3/2010 | Sun et al. | 345/156 |
| 7,852,315 | B2 | * | 12/2010 | Ofek et al. | 345/157 |
| 2002/0130838 | A1 | * | 9/2002 | Feierbach | 345/157 |
| 2003/0081833 | A1 | * | 5/2003 | Tilton | 382/173 |
| 2004/0246229 | A1 | * | 12/2004 | Yamada | 345/156 |
| 2005/0104849 | A1 | * | 5/2005 | Hoile | 345/157 |
| 2005/0116931 | A1 | * | 6/2005 | Olbrich | 345/158 |
| 2007/0040800 | A1 | * | 2/2007 | Forlines et al. | 345/158 |
| 2007/0195060 | A1 | * | 8/2007 | Moscovitch | 345/157 |
| 2007/0211027 | A1 | * | 9/2007 | Ohta | 345/158 |
| 2008/0174551 | A1 | * | 7/2008 | Ishibashi | 345/158 |

OTHER PUBLICATIONS

Online Training Solutions Inc.; Microsoft Windows XP Step by Step; Aug. 25, 2005 Second Edition, pp. 1-17.*
Ahlborn, Benjamin, A., et al., "A Practical System for Laser Pointer Interaction on Large Displays," VRST '05, Nov. 7-9, 2005, Monterey, CA, USA, 4 pages (2005).

(Continued)

*Primary Examiner* — Alexander Eisen
*Assistant Examiner* — Patrick F Marinelli
(74) *Attorney, Agent, or Firm* — Morgan, Lewis & Bockius LLP

(57) ABSTRACT

A system provides for controlling a cursor on a screen automatically and dynamically when using a video camera as a pointing device. A computer displays static or dynamic content to a screen. A video camera connected to the computer points at the screen. As the video camera films the screen, frames captured by the video camera are sent to the computer. A target image is displayed by the computer onto the screen and marks the position of the screen cursor of the video camera. Frames captured by the video camera include the target image, and the computer dynamically moves the target image on the screen to ensure that the target image stays in the center of the view of the video camera.

25 Claims, 12 Drawing Sheets

OTHER PUBLICATIONS

Chen, Xing, et al., "Lumipoint: Multi-User Laser-Based Interaction on Large Tiled Displays," Displays, vol. 23, Issue 5, downloaded from http://www.graphics.stanford.edu/papers/multiuser/CS-TR-2000-04.pdf on May 24, 2007, at http://www.webcitation.org/5P50lb6c4, 4 pages (2002).

Dan's Data, "Natural Point trackIR cursor control system," downloaded from http://dansdata.com/trackir.htm on Aug. 3, 2007, at http://www.webcitation.org/5QpVFowLI, 14 pages.

Forlines, Clifton, et al., "Zoom-and-Pick: Facilitating Visual Zooming and Precision Pointing with Interactive Handheld Projectors," ACM Symposium on User Interface Software and Technology (USIT), Oct. 23-27, 2005, Seattle, WA, USA, 11 pages (2005).

Jiang, Hao, et al., "Direct Pointer: Direct Manipulation for Large-Display Interaction Using Handheld Cameras," CHI 2006 Proceedings, Apr. 22-27, 2006, Montreal, Quebec, Canada, 4 pages (2006).

Oh, Ji-Young, et al., "Laser Pointers as Collaborative Pointing Devices," Proceedings of Graphics Interface 2002, downloaded from http://www.graphicsinterface.org/cgi-bin/DownloadPaper?name=2002/221/paper221.pdf on May 24, 2007, at http://www.webcitation.org/5P51oSiEK, 9 pages.

Olsen, Dan R., et al., "Laser Pointer Interaction," SIGCHI'01, Mar. 31-Apr. 4, 2001, Seattle, WA, USA, pp. 17-22 (2001).

Sukthankar, Rahul, et al., "Self-Calibrating Camera-Assisted Presentation Interface," Proceedings of International Conference on Control, Automation, Robotics, and Vision (ICARCV), 6 pages (2000).

Sukthankar, Rahul, et al., "Smarter Presentations: Exploiting Homography in Camera-Projector Systems," Proceedings of International Conference on Computer Vision, 7 pages (2001).

* cited by examiner

DYNAMICALLY CONTROLLING A CURSOR ON A SCREEN WHEN USING A VIDEO CAMERA AS A POINTING DEVICE

BACKGROUND OF THE INVENTION

1. Field of the Invention

The present invention relates to video cameras, and in particular describes dynamically controlling a cursor on a screen when using a video camera as a pointing device.

2. Description of the Related Art

A video camera can be used as a pointing device for a computer system. To accomplish this, the computer system displays an image on a computer screen of a computer display or projects an image onto a projection screen. The camera is pointed toward the computer screen and controls a screen cursor, which is a moving marker or pointer that indicates a position on the screen. This setup can be used for computer screen presentations in front of groups of people, for example, when the user of the camera gives a presentation.

To detect the cursor of the pointing device in the frame captured by the camera, some current computer systems identify several interest points between consecutive frames, estimate the affine transformation between them, warp one frame to the other using this transformation, and then detect the cursor as the area of difference between the two frames. An affine transformation is a transformation of coordinates that is equivalent to a linear transformation followed by a translation. In addition to being central processing unit (CPU) intensive, these systems break down if the screen shows dynamic content, for example video, animation, and dragging windows. One solution would be to use a camera with a very high frame rate, higher than which the screen of the frame is capable. With current screens refreshing at 70 Hz or more, this solution is very expensive, however. This solution would also require a lot of bandwidth if the processing is done on the computer that acts as a controller to control the screen and cursor.

More importantly, these current computer systems likely lose tracking of their cursors. As users move farther away from the screen, the size of the cursor decreases, as viewed through the camera. In addition, these systems do not provide ways to estimate the distance of the user to the screen, do not provide user interfaces for picking the pointers or re-initializing them after the camera view points away from the screen, and do not estimate the yaw, pitch and roll of the camera, all of which are useful to estimate the location of the user with respect to the screen and useful to predict how the cursor should move. Further, these systems do not allow multiple users. Most likely, these systems would scale poorly in terms of tracking efficiency, CPU, and bandwidth requirements. Further, these systems do not allow users to move the pointer across multiple screens, beyond the trivial case of multiple screens implemented as a single extended desktop.

Regarding tracking a laser pointer, current systems provide a fixed camera that looks at the entire screen and tries to detect the location of a bright laser pointer. This type of tracking requires installing the camera in a fixed location and calibrating it to the system or providing a self-calibrating system. Finding where to mount the camera to prevent occlusion, or possible obstructions in the camera view, can be inconvenient. Multiple pointers can be problematic to detect when they are of the same color. Security can be an issue, as anyone in the room can control the pointer. For example, in a conference room with five hundred people, anyone could shine a laser pointer onto the screen from the back of the room.

Alternate pointing devices are not as desirable for various reasons. Touch screens are inconvenient and sometimes impossible for large screens when users are unable to reach the top of the screen. Touch screens are also expensive. Multiple user input is expensive and sometimes awkward because all users need to come to the screen to touch it. An example of a multiple user touch screen use is a brainstorming session around a vehicle design displayed to the touch screen, or for any application that accommodates several users. A pointing device such as a mouse does not provide direct interaction, as in the case of a touch screen. A mouse provides an indirect interaction because the mouse, as a separate device, is used to move the pointer. Further, pointing with a mouse becomes slower when screens are large. Pointing devices such as light pens and light guns rely on the use of scan-based, but not progressive, cathode ray tube (CRT) screens. They do not function with liquid crystal displays (LCDs) or projection screens, however.

It would be beneficial to provide an improved system for controlling a cursor on a screen when using a video camera as a pointing device.

SUMMARY OF THE INVENTION

A system provides for controlling a cursor on a screen automatically and dynamically when using a video camera as a pointing device. A computer displays static or dynamic content to a screen. A video camera connected to the computer points at the screen. As the video camera films the screen, frames captured by the video camera are sent to the computer. A target image is displayed by the computer onto the screen and marks the position of the screen cursor of the video camera. Frames captured by the video camera include the target image, and the computer dynamically moves the target image on the screen to ensure that the target image stays in the center of the view of the video camera.

BRIEF DESCRIPTION OF THE DRAWINGS

Preferred embodiment(s) of the present invention will be described in detail based on the following figures, wherein.

DETAILED DESCRIPTION OF THE INVENTION

Herein is described system that provides for controlling a cursor on a screen automatically and dynamically when using a video camera as a pointing device. The system controls one or multiple pointers on a screen from a distance. The system is initialized seamlessly, without the need for calibration or installation of a fixed camera, thus enabling the easy addition of remote pointing to any screen.

Further, the system can track a cursor efficiently without the need for high frame rate cameras, with lower CPU requirements, with less bandwidth requirements, and that is less expensive. The system works with very low frame rate cameras, such as webcams. In addition, tracking works regardless of the type of content displayed, including static and dynamic content. Thus, the system works in real-time.

The system does not lose tracking of the cursor. As a user moves farther away from the display, the system adjusts the cursor image and its size so that the tracked cursor remains detectable. The system can estimate distance of the camera from the screen, as well as yaw, pitch and roll of the camera. The system can directly control a cursor. The system is neither slow when the screen is large, nor inconvenient, nor awkward. It also works with liquid crystal displays (LCDs) or projection screens.

The system provides a user interface to allow picking a cursor, as well as to initialize or re-initialize the cursor should the cursor become lost. The system enables a user to move the pointer across multiple screens. The system enables multiple users simultaneously to control their respective cursors on one or more screens.

Interaction Design

Figure 1:
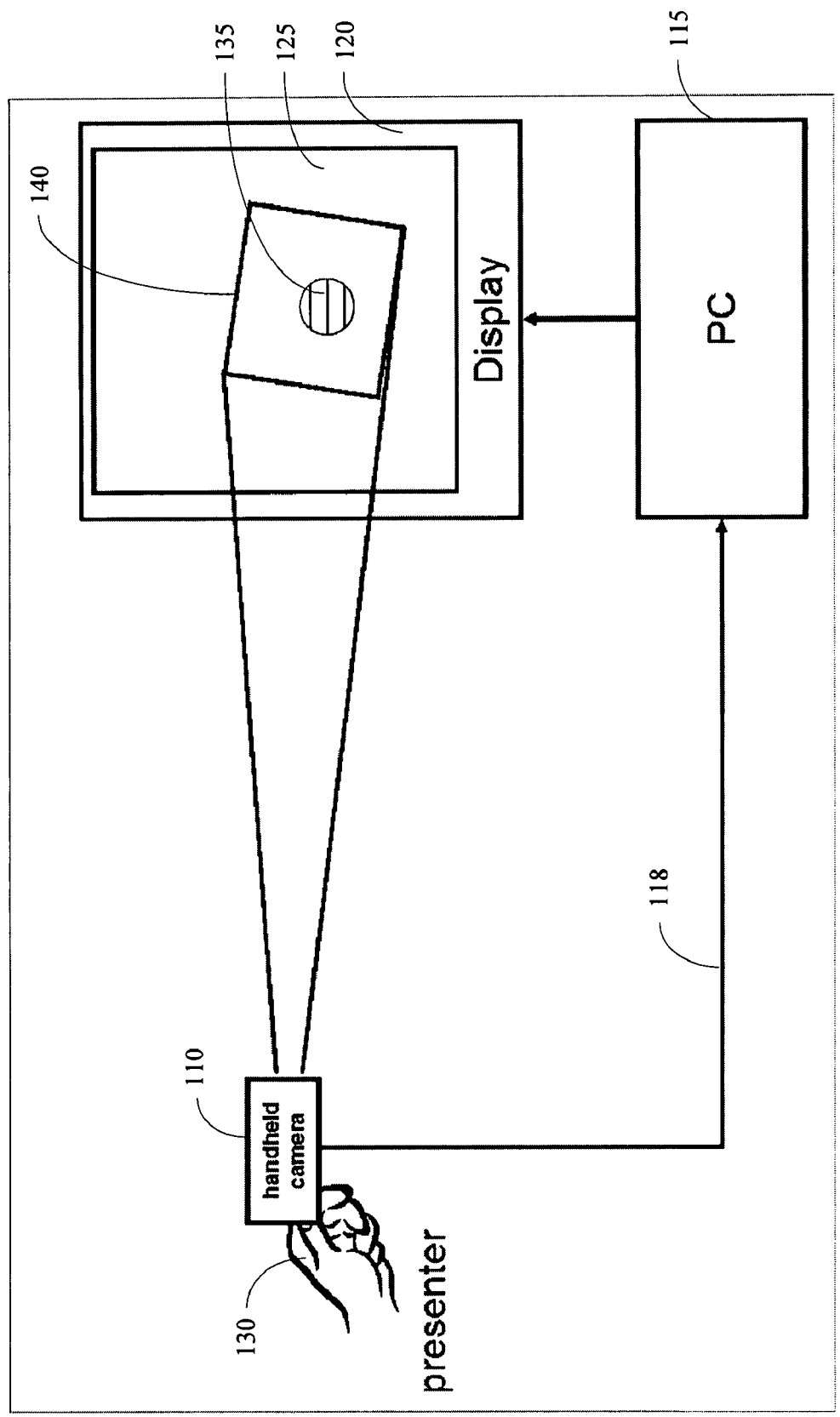
FIG. 1 illustrates an example system for using a video camera as a pointing device on a screen, according to embodiments of the present invention.

FIG. 1 illustrates an example system for using a video camera as a pointing device on a screen, according to embodiments of the present invention. The camera 110 can be any type of camera, including a webcam, as well as any type of device that includes a camera. The camera 110 is connected to a computer 115, labeled as PC, via connection 118. In this example, the computer display 120 of computer 115 has a screen 125 upon which static or dynamic content can be displayed. In other embodiments, content saved on the computer can be projected on a projection screen. A user 130, or "presenter" of a presentation, aims the camera 110 at screen 125. In embodiments, the user aims the camera manually. In embodiments, the user aims the camera using software on the computer.

The computer 115 automatically and dynamically finds the screen coordinates of the location on the screen where the camera 110 is pointing. The system then acts on this information. To accomplish this, the computer 115 presents a visual "target image" 135 on the screen 120. The target image 135 can be a circle filled in with the color blue, with the color blue shown as horizontal hatches inside the circle. Frame 140 is the part of the image displayed on the screen that is viewed and captured by the camera 110. While the camera 110 films the screen 125, frames 140 captured by the camera are sent to the computer 130.

In embodiments, the target image can be filled in with any color or can be multi-colored. The target image can also be of any shape. The target image 135 marks the position of a cursor of the camera pointing device. Hereinafter, the terms "target image" and "cursor" will be used interchangeably.

The computer 115 acts as a controller to control the screen and cursor. Hereinafter, the computer 115 will be referred to as a controller. The controller moves the target image 135 so that it stays in the center of the camera view as the user 130 aims the camera 110 at different areas of the screen 125. While aiming the camera, the user is not necessarily close to the screen. Effectively, the user controls the position of the target image 135 with the camera 110. Buttons on the camera can trigger events such as mouse down and mouse up, allowing users to draw on the screen by moving the camera or to select and move objects on the screen.

Two modes of operation are possible with this device. These two modes are the single cursor mode and the multiple-cursor mode, which involve a single camera and multiple cameras, respectively. In the single cursor mode, the user can acquire a target image with a camera, in order to control the cursor. The target image can be acquired either by capturing it with the camera, or by moving the camera view to a known and easily-detectable location, for example, the upper left corner or an edge of the screen. In the multiple-cursor mode, each of the multiple cameras has its own target image that is drawn wherever the particular camera is pointing on the screen. For each camera, the controller of a camera positions the camera's target image to the area viewed by the camera. In embodiments, one controller can control two or more cameras and their corresponding target images. In embodiments, for either mode of operation, optionally a mode switch on the camera could hide the target image.

Repositioning the target image to the area near the edge of a screen, when the camera pans onto the screen, provides a natural method of allowing pointing across multiple screens. For example, with two adjacent screens side by side, moving the camera from the left screen onto the right screen will cause the target image to follow. This natural user interaction is also very useful to the controllers, as the controllers then know which screen is next to which.

Tracking of the Cursor

The system incrementally adjusts the position of the target image to maintain it in the center of the camera view. For a camera pointed at a screen, the controller finds the coordinates (X,Y,Z) of the camera's position relative to the screen. These coordinates are determined by estimating the camera's distance from the screen, as well as the yaw, pitch, and roll of the camera, discussed in further detail below. The controller uses the camera's position information to ensure that the target image stays in the center of view of the camera.

Figure 2:
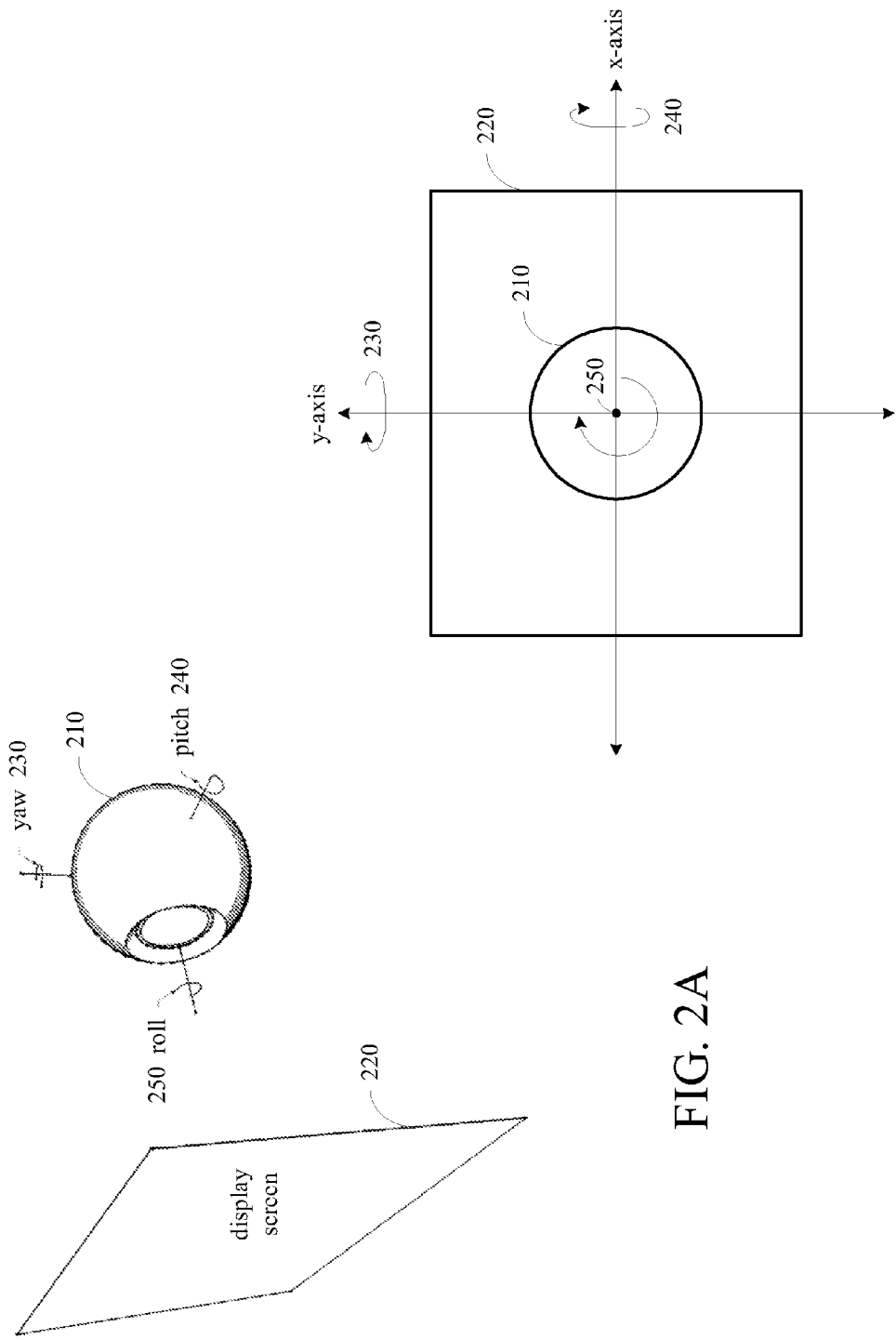
FIGS. 2A and 2B illustrate that the axis of an example camera and the axis of an example screen can be in an arbitrary orientation relative to one another, according to embodiments of the invention.

FIGS. 2A and 2B illustrate that the axis of an example camera and the axis of an example screen can be in an arbitrary orientation relative to one another, according to embodiments of the invention. FIG. 2A shows a camera 210 pointing at a screen 220, and FIG. 2B shows the same camera 210 from the back as it is pointed at the screen 220. In both figures, yaw 230 is movement of the camera around a vertical axis, or y-axis as shown in FIG. 2B. Pitch 240 is movement of the camera around a horizontal axis, or x-axis as shown in FIG. 2B. Roll 250 is movement of the camera side to side, or z-axis, which is not shown. In FIG. 2B, however, the z-axis is shown as point 250 around which the camera would roll from side to side.

The system needs to compensate either implicitly or explicitly for the relative attitudes of the screen and camera during the course of tracking the cursor. The attitudes of the screen and the camera are their orientations relative to each other. In the case that the pattern of the target image has a distinct, non-symmetrical shape, the attitude of the camera relative to the target image can be determined from a single observation, or one frame captured by the camera. This is not strictly required since the tracking system can use multiple observations of the target image to determine the direction in screen coordinates in which the target image needs to be moved to approach the center of the camera view.

Figure 3:
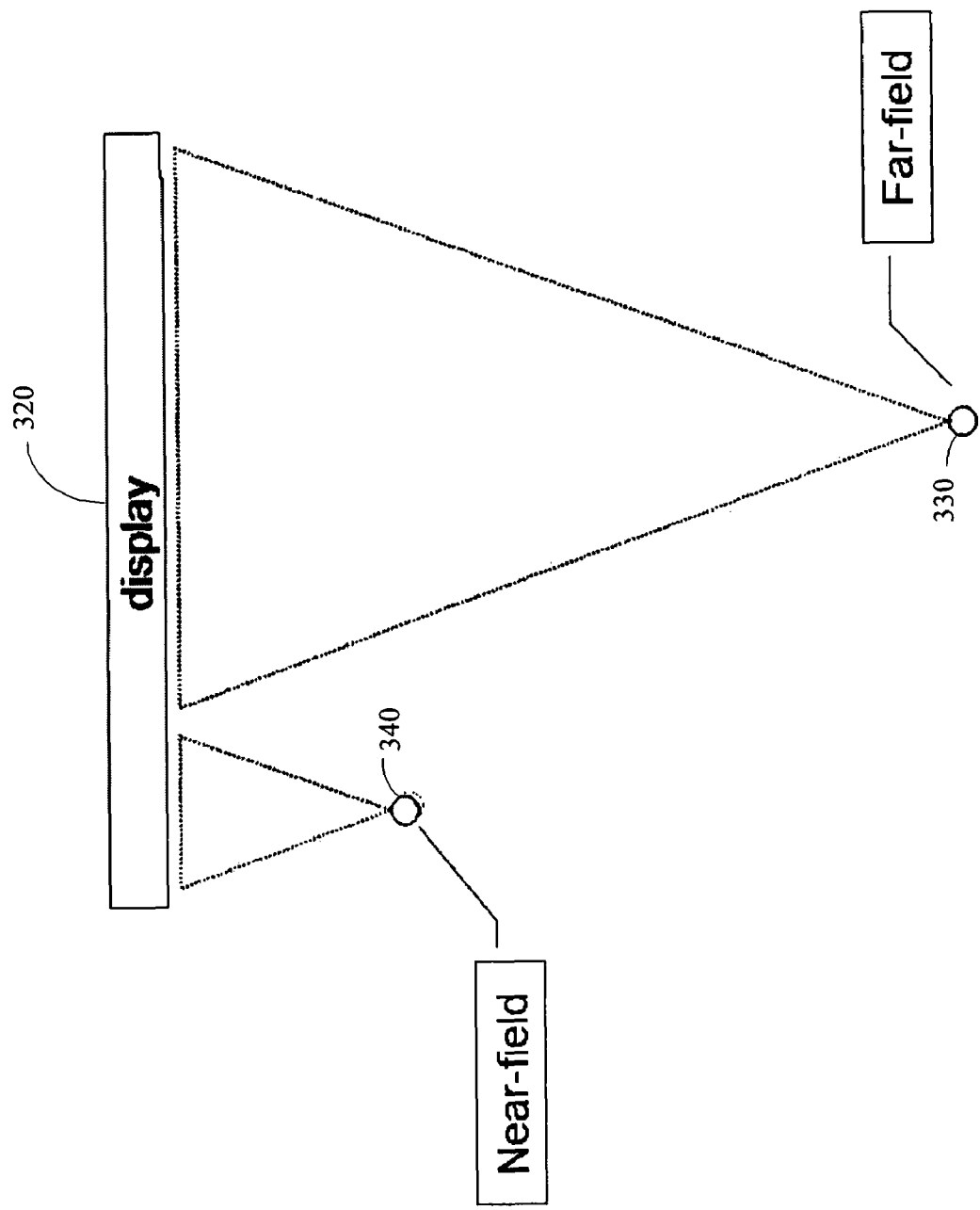
FIG. 3 illustrates two example cameras at different distances from a screen, according to embodiments of the present invention.

FIG. 3 illustrates two example cameras at different distances from a screen, according to embodiments of the present invention. The behavior of a camera and view will be quite different depending on the distance of the camera from the screen. In a far-field example, a far-field camera 330, or pointing device, is at some appreciable distance from the screen 320. For example, camera 330 is at a distance greater than the diagonal (not shown) of the screen itself. When using the pointing device as a laser pointer, the movement of the pointer will vary most significantly in angle, rather than position. In particular, yaw and pitch of the camera 330 relative to the screen 320 will determine the angle of the camera relative to the screen. At the same time, the large distance between the screen 320 and camera 330 means the camera view will capture a larger portion of the screen. This makes it more likely that the target image will remain visible, but reduces the resolution based on number of pixels at which the target image is captured by the camera.

In a near-field example, a near-field camera 340, or pointing device, is being held close to the screen 320, more in the manner of a pen. The camera view will be closer to nearly perpendicular to the screen 320. Thus, the movement of the pointer will vary most significantly in position from the translation or movement of the camera 340, rather than angle from the yaw and pitch of the camera 340. The amount of the screen captured by the camera 340 will be smaller but captured at a higher resolution.

The controller, or computer controlling the screen, takes the distance of the camera from the screen into consideration when determining the size and opacity of the target image, as discussed below.

Basic Case of Tracking the Cursor

In the basic case of tracking the cursor, as the camera is capturing a portion of the screen, the camera sends the captured frames to the controller, which then processes the captured frames coming from the camera. For each frame coming from the camera, the controller moves the target image on the screen toward the center of the portion of the screen that matches the frame.

Figure 4:
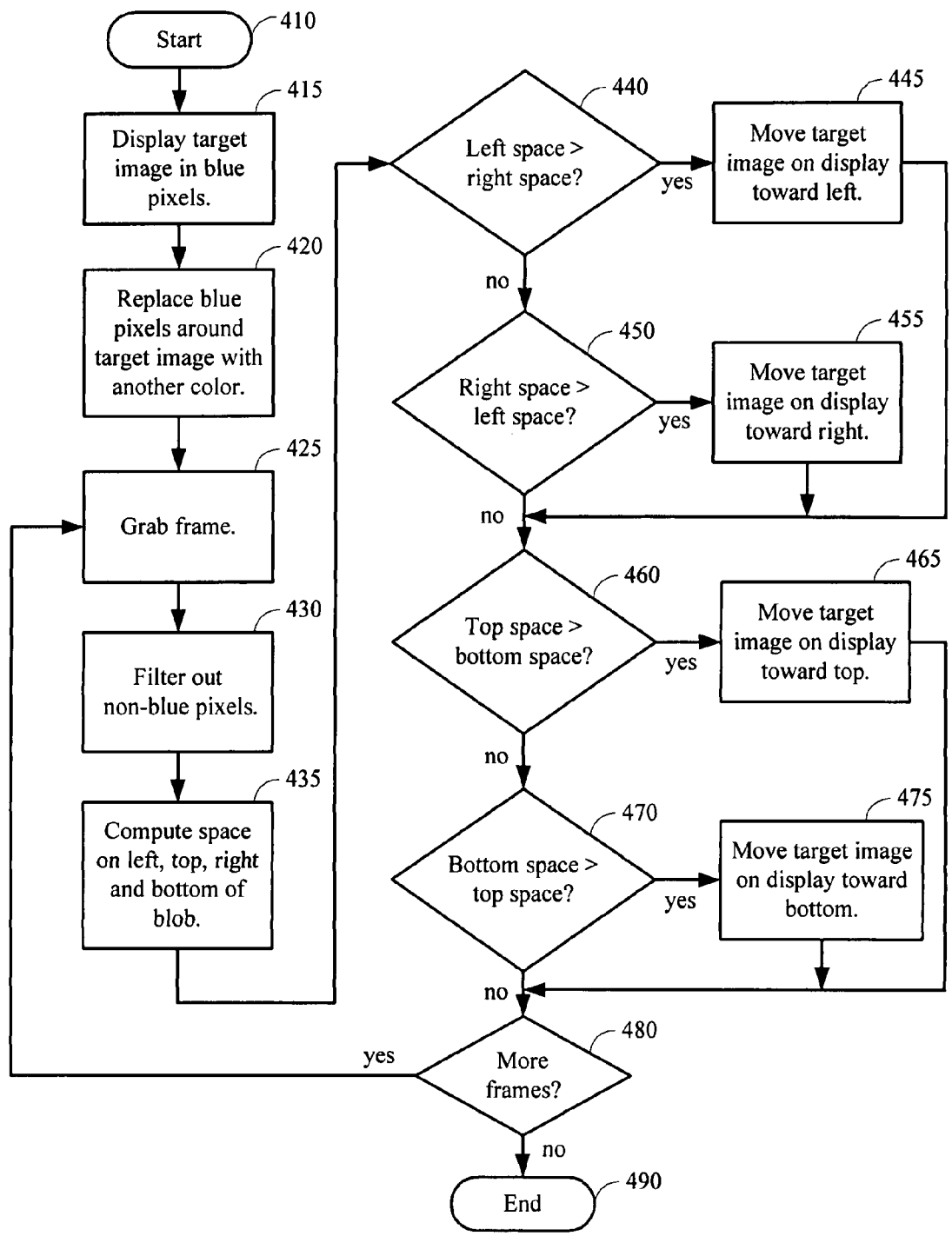
FIG. 4 is a flow chart of an example process for tracking of a cursor by a controller, according to embodiments of the present invention.

FIG. 4 is a flow chart of an example process for tracking a cursor by a controller, according to embodiments of the present invention. The process starts in step 410. In step 415, the target image is displayed somewhere on the screen, for example on the bottom left of the screen. The target image is displayed in blue pixels. In step 420, blue pixels around the perimeter of the target image on the screen are replaced by another color to make sure the target image stands out from the image in the rest of the screen. In embodiments, alternatively, the contrast of the pixels around the perimeter of the target image could be adjusted brighter or dimmer to make the target image stand out. In embodiments, if the blue target image is displayed over a blue area in the screen, the color of the target image could be changed. The controller grabs the frame coming from the camera in step 425. All non-blue pixels are filtered out of the frame in step 430.

The space on the left, top, right and bottom of the "blob" of blue pixels is computed in step 435. The blob includes blue pixels from the target image, as well as blue pixels from the current frame. The height and width of the blob are also computed in order to compute these four spaces. In step 440, if the left space is larger than the right space, the controller moves the target image toward the left on the screen in step 445, and the process proceeds to step 460. In step 440, if the left space is not larger than the right space, then in step 450, if the right space is larger than the left space, the controller moves the target image toward the right on the screen in step 455, and process proceeds to step 460. In step 450, if the right space is not larger than the left space, then the right space is equal to the left space. In this case, the target image does not need to be moved toward the right or left on the screen.

In step 460, if the top space is larger than the bottom space, the controller moves the target image toward the top of the screen in step 465, and the process proceeds to step 480. In step 460, if the top space is not larger than the bottom space, then in step 470, if the bottom space is larger than the top space, the controller moves the target image toward the bottom of the screen in step 475, and the process proceeds to step 480. In step 470, if the bottom space is not larger than the top space, then the top space is equal to the bottom space. In this case, the target image does not need to be moved toward the top or bottom of the screen. In step 480, if there are more camera frames to process in step 480, the process loops back to step 425. If there are no more camera frames to process in step 480, the process ends in step 490.

Changing the Size and Opacity of the Target Image

If a user moves a camera closer to or farther away from a screen while filming the screen, the system estimates the location of the camera relative to the screen. The system then adjusts the size and opacity of the target image accordingly, as the distance of the camera from the screen increases or decreases. This adjustment improves the ability of the controller to detect the target image within each frame captured by the camera, and makes the target image easier for users to see on the screen. When the controller receives a frame captured by the camera, the controller makes a determination regarding the size and opacity of the target image in the frame and adjusts the target image accordingly.

Both the size and opacity of the target image can be adjusted based on the relative contrast with the screen and on ambient lighting in the room. Increasing or decreasing the size or opacity of the target image maps directly to what users would expect. As an analogy, when a spotlight is shined on a surface, the spot increases in size the further away the spotlight is moved from the surface, and the spot decreases in size the closer the spotlight is moved toward the surface. Similarly, the target image increases in size the further away the camera is moved from the screen, and the target image decreases in size the closer the camera is moved toward the screen. Opacity of the target image is the degree to which the target image is impenetrable to visible light. As with the size of the target image, the opacity of the target image is greater the closer the camera is moved toward the screen, and the opacity of the target image is lesser the further away the camera is moved from the screen.

Further, the precision of the control of the camera pointing device maps to the distance between the camera and the screen. At close distance, the accuracy will be better, the shape of the pointer smaller, and the user will be able to control the pointer precisely, for example handwriting. At a greater distance, the system can automatically switch to a different way of rendering things. For example, the target image itself can be made semi-transparent to improve legibility of partially-obscured information.

In embodiments, if the height and/or width of the blob, as detected in step 435 of FIG. 4, are smaller than a predefined percentage of the height and width of the current frame from the camera, the controller augments the size of the blob by height and/or width. If the height and/or width of the blob are larger than the predefined percentage, the controller reduces the size of the blob by height and/or width. In embodiments, optionally the controller can stop augmenting or decreasing the size of the blob when a predefined size is reached. For these embodiments, control of the cursor thus can be enabled only when the camera is close enough to the screen. If the camera is too far away from the screen because the blob is larger than the second predefined size, the controller could automatically stop tracking the target image.

Detecting the Rotation of the Camera Relative to the Target Image

The system detects the rotation of the camera relative to the target image. The controller can use this information for controlling a user interface. For example, in an audio application, a user can use the camera pointing device to control a widget on the screen such as a knob, for example to control volume. The controller dynamically rotates the knob image displayed on the screen based on an estimation of the rotation of the camera, or the "roll" of the camera. The knob image will be rotated to a reverse of the angle at which the target image appears rotated in a frame from the camera.

Rotation of the camera relative to the target image can also be used as a first step in determining the position of the camera relative to the screen, for example, for another type of cursor control. For example, a user can use the camera pointing device to control another widget on the screen such as linear slider, for example to control volume. Other examples of a linear slider include any continuous control, such as brightness or color of an image, or any switch, such as a checkbox rendered as a toggle switch that can be flipped left-right or up-down. The controller dynamically moves the slider displayed on the screen based on an estimation of movement of the camera from left to right, or right to left. A captured frame would first be checked for rotation of the target image. If the target image is rotated, the frame is rotated back to a normal view. This rotation of the frame is a first step to normalizing the process so that the relative camera position can be determined independent of the rotation. Rotation of the frame back to a normal view is discussed below relative to FIGS. 5A-5C and FIG. 6.

Figure 5:
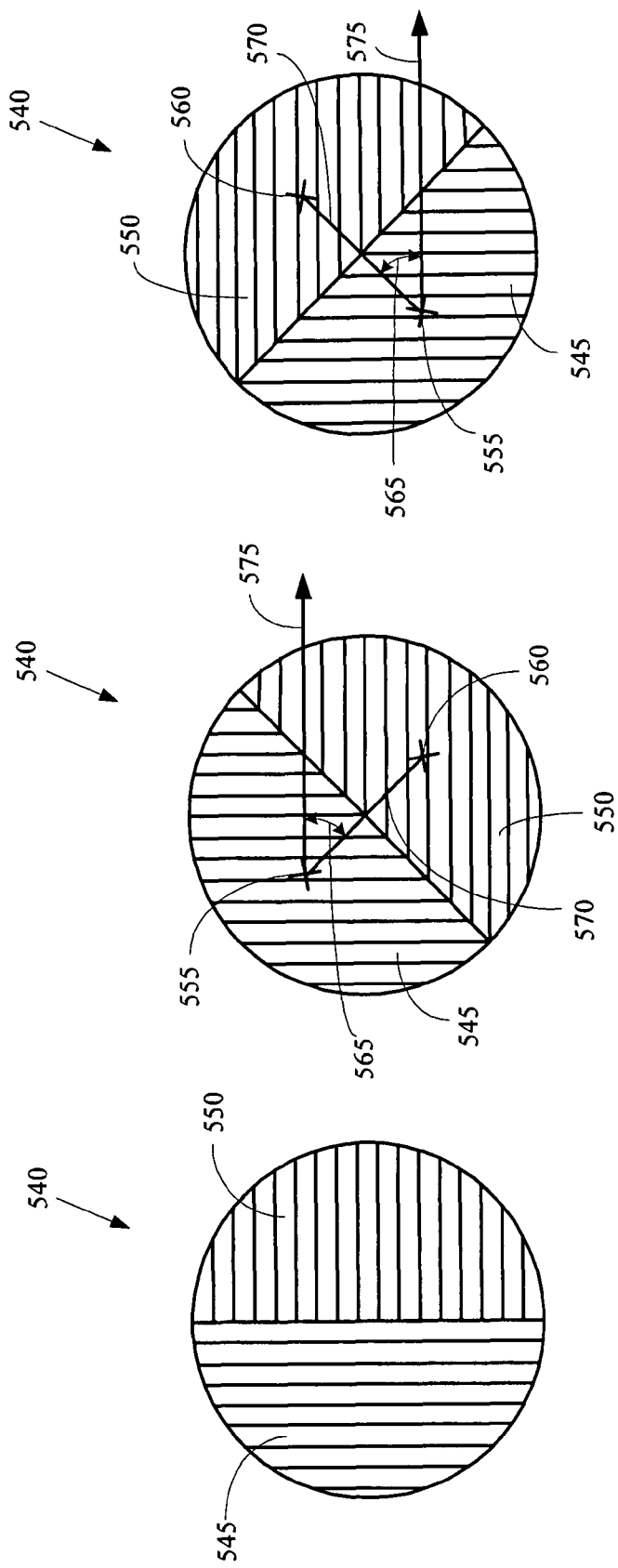
FIGS. 5A-5C illustrate various example positions of a rotated target image, according to embodiments of the present invention.

FIGS. 5A-5C illustrate various example positions of a rotated target image, according to embodiments of the present invention. In these figures, the target image is a circle filled in with red and blue. The left half of target image 540 is a red half-disk 545 with the red color shown as vertical hatches. The right half of target image 540 is a blue half-disk 550 with the blue color shown as horizontal hatches. In embodiments, the half-disks can be filled in with any two colors.

For the target images of FIGS. 5A-5C, the perspective as viewed from the camera is the same as from camera 210 in FIG. 2B. The screen 220 is in front of the camera 210. FIG. 5A illustrates the two half disks of the target image as shown from camera 210 with no roll around the z-axis, shown as point 250. FIG. 5B illustrates the two half disks 545 and 550 of the target image as shown from camera 210 that is rolled to the left relative to the screen, causing the target image appear to be rotated to the right in the frame. The camera 210 is rolled to the left around the z-axis, shown as point 250 in FIG. 2B. Similarly, FIG. 5C illustrates the two half disks 545 and 550 of the target image as shown from camera 210 that is rolled to the right relative to the screen, causing the target image appear to be rotated to the left in the frame. The camera 210 is rolled to the right around the z-axis, shown as point 250 in FIG. 2B.

Figure 6:
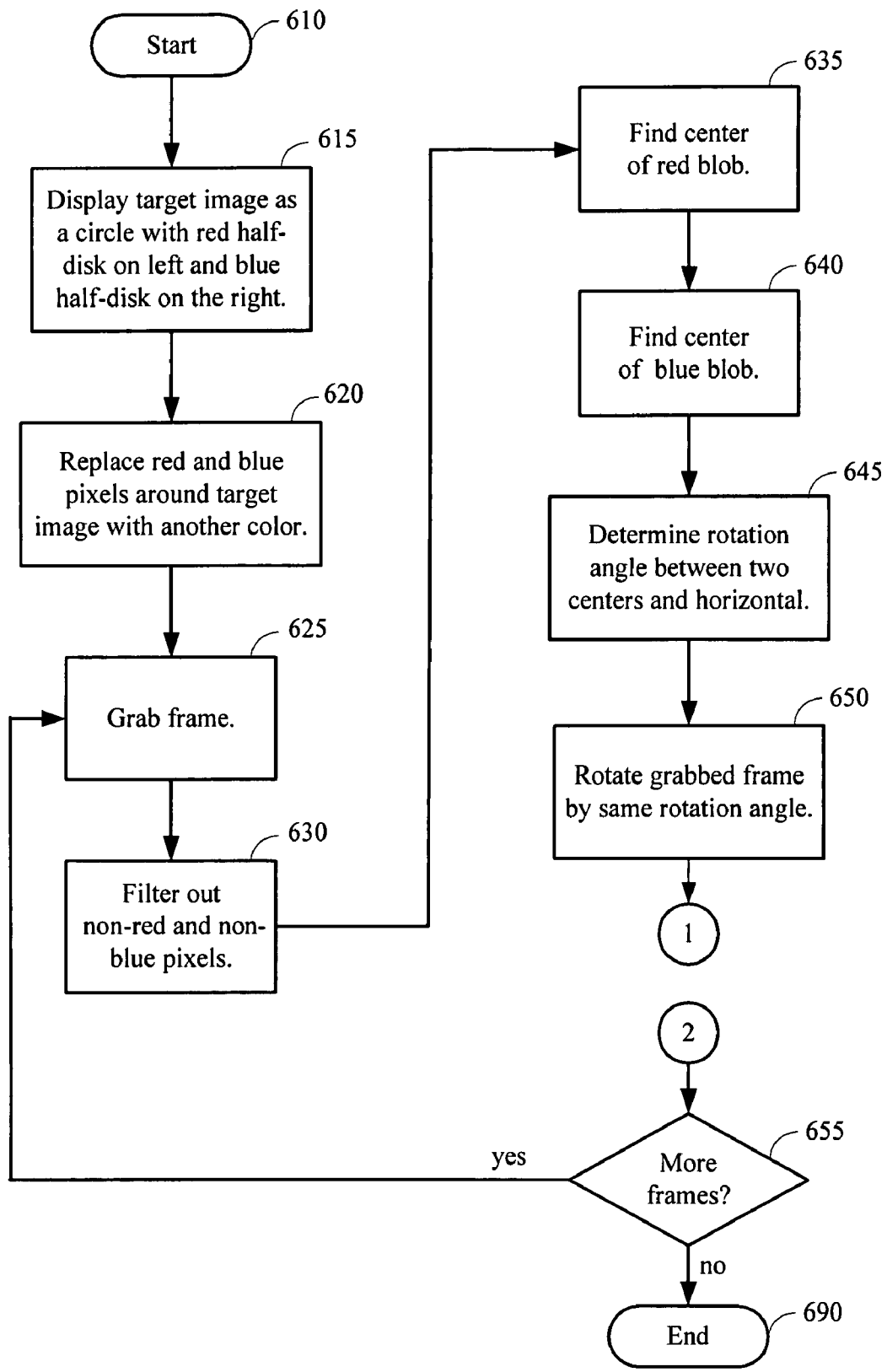
FIG. 6 is a flow chart of an example process for detecting rotation of a camera relative to a target image, according to embodiments of the present invention.

FIG. 6 is a flow chart of an example process for detecting rotation of a camera relative to a target image, according to embodiments of the present invention. The process of FIG. 6 is discussed in conjunction with the target image positions shown in FIGS. 5A-5C. The process starts in step 610. In step 615, the target image is displayed as a circle filled in with a red half-disk and a blue half-disk on the right. This circle is the same as that shown in FIG. 5A. The target image is displayed somewhere on the screen, for example on the bottom left of the screen. In step 620, the red pixels and the blue pixels around the perimeter of the target image are replaced by another color. The controller grabs the frame coming from the camera in step 625. All non-red and non-blue pixels are filtered out of the frame in step 630.

In step 635, the center of the red "blob" is found. The red blob includes the red pixels from the target image, as well as red pixels from the current frame. For illustrative purposes, the red blob in FIGS. 5B and 5C is shown simply as the left half of the target image. The center of red blob 555 is shown in FIGS. 5B and 5C. In step 640, the center of the blue "blob" is found. The blue blob includes the blue pixels from the target image, as well as blue pixels from the current frame. As for the red blob, for illustrative purposes, the blue blob in FIGS. 5B and 5C is shown simply as the right half of the target image. The center of blue blob 560 is shown in FIGS. 5B and 5C.

The rotation angle is then determined between the two centers and horizontal in step 645. To determine this angle 565, two lines 570 and 575 are calculated for the target image to form the angle, as shown in FIGS. 5B and 5C. Line 570 extends from the center of the red blob 555 to the center of the blue blob 560. Line 575 is horizontal and extends from the center of the red blob 555 toward the blue blob 550 in the horizontal plane relative to the frame capturing the target image. The horizontal line could also have originated from the center of the blue blob extending toward the red blob on the horizontal plane relative to the frame. Lines 570 and 575 are not drawn on the screen but are instead used for calculation of the rotation angle in step 645.

In step 650, once the rotation angle has been found, the controller rotates the grabbed frame by the same amount as the rotation angle. For example, in FIG. 5B, the target image has been rotated roughly −45 degrees. The frame is then also rotated by roughly −45 degrees in step 650. Similarly, in the example of FIG. 5C, the target image has been rotated roughly 45 degrees. The frame is then also rotated roughly 45 degrees in step 650. The frame is rotated so that further analysis of the target image within the captured frame can continue as if the camera was not rotated. By rotating the captured frame back to a view of the target image that is not rotated, the estimate of the camera position that follows in the discussion related to FIG. 7 has rotation taken out of the equation. The process then connects to the flow chart of FIG. 7 through connector 1.

Detecting the Position of the Camera Relative to the Target Image

The controller also estimates the position of the camera relative to the target image by detecting the yaw 230 and pitch 240 of the camera 210 relative to the screen 220. Yaw 230 and pitch 240 are discussed above for FIG. 2A.

Figure 7:
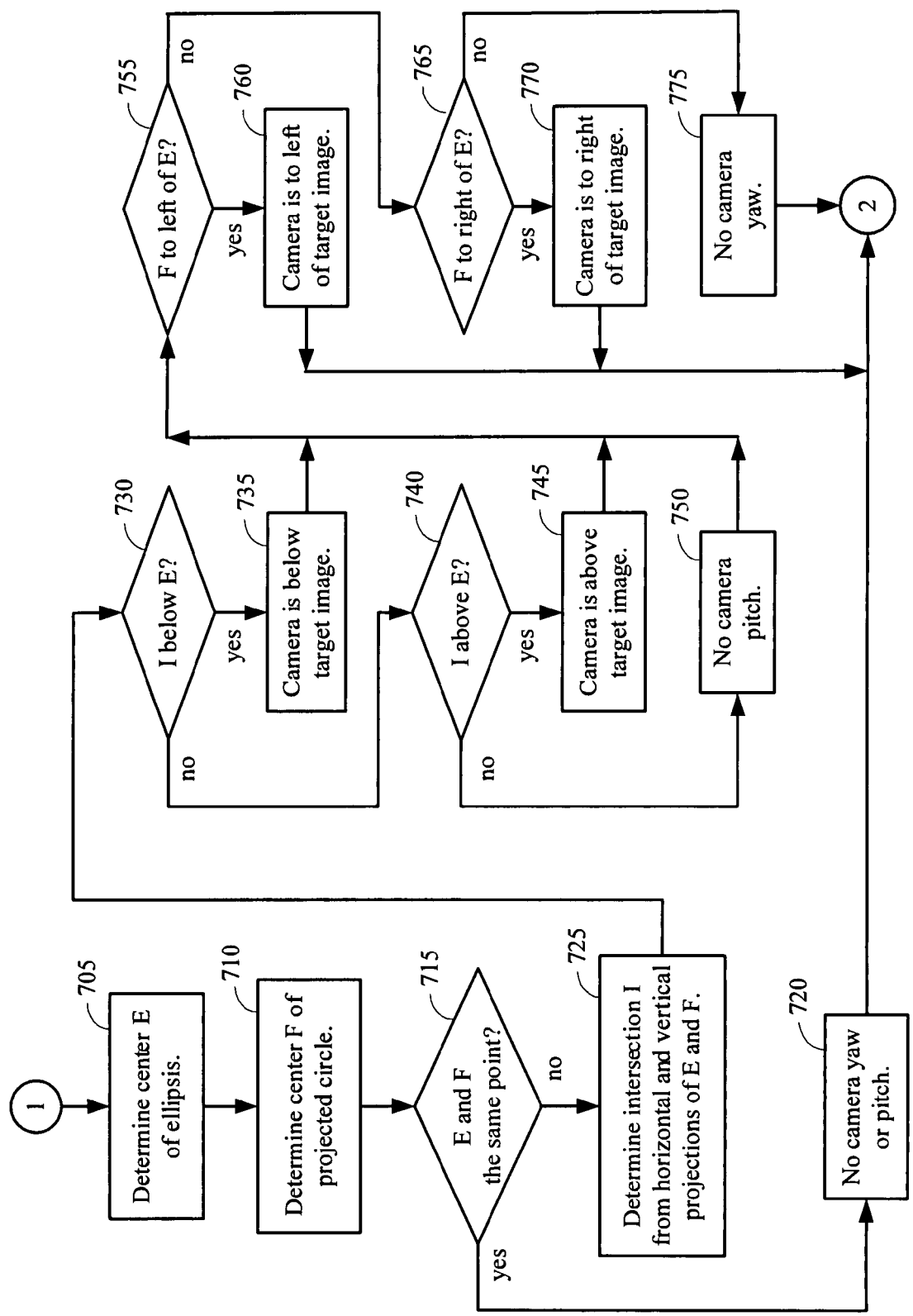
FIG. 7 is a flow chart of an example process for detecting position of a camera relative to a target image, according to embodiments of the present invention.
Figure 8:
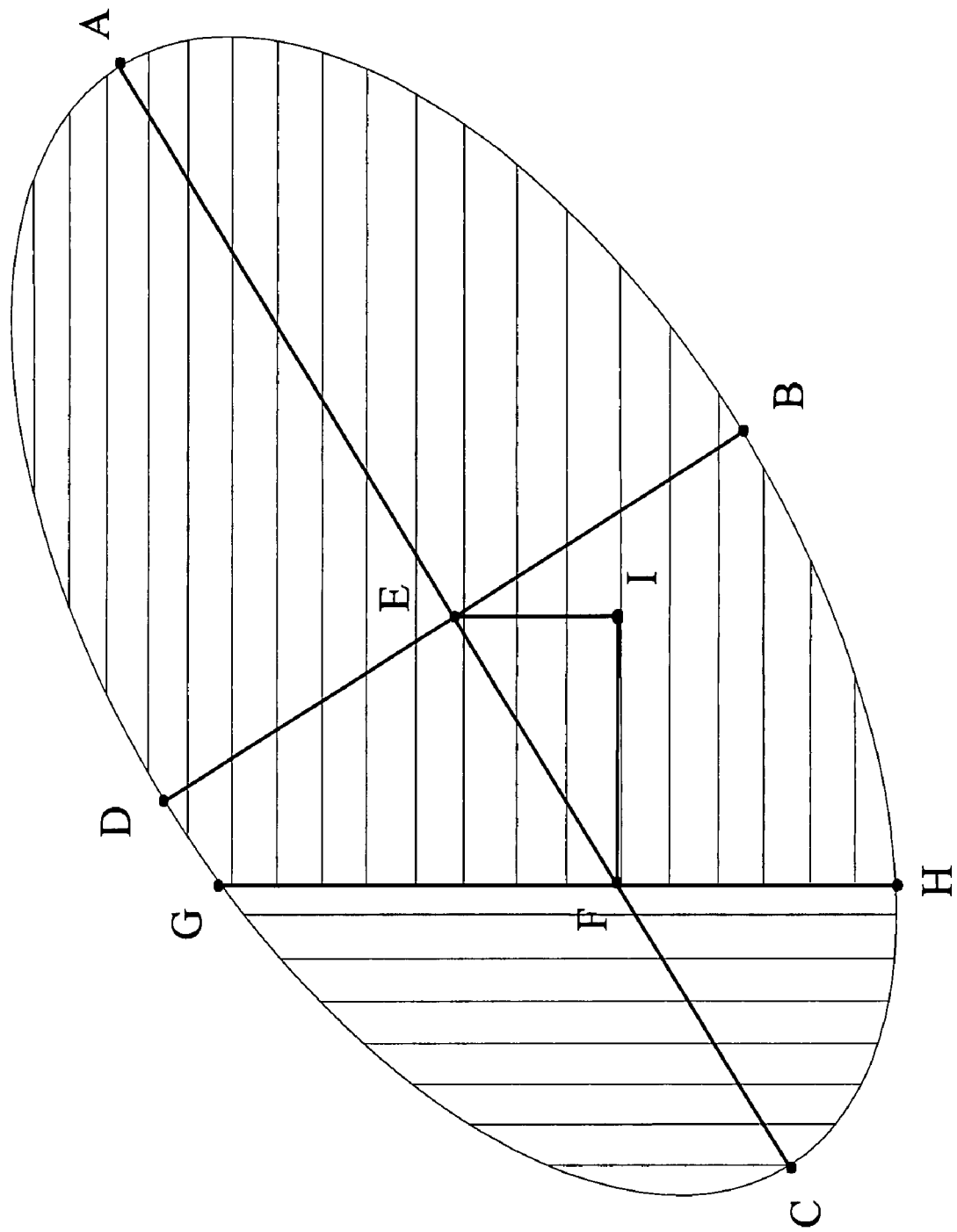
FIG. 8 illustrates an example position of a target image used with the example process of FIG. 7, according to embodiments of the present invention.

FIG. 7 is a flow chart of an example process for detecting position of a camera relative to a target image, according to embodiments of the present invention. FIG. 8 illustrates an example position of a target image used with the example process of FIG. 7, according to embodiments of the present invention. The process of FIG. 7 is discussed in conjunction with the target image shown in FIG. 8. The process starts in connector 1 from FIG. 6. If the position of the camera is directly in front of the target image, then the target image appears as a circle in the captured frame. Otherwise, the target image appears as an ellipsis, which is generally the case.

In step 705, the center of the ellipsis is determined to be at point E, as shown in FIG. 8. A line from point A to point C is the longest or major axis of the ellipse. A line from point B to point D is the minor or shortest axis of the ellipse. The intersection between lines AC and BD is determined to be point E. In step 710, the center of the projected target image circle is determined to be at point F. In FIG. 6, the captured frame was rotated back to a view of the target image that is not rotated, if needed, so the image should appear as a red blob and a blue blob separated by a vertical line. With the target image that used two halves, the vertical line between points G and H is determined as the boundary between the red half from the blue half of the target image. The mostly horizontal line between points A and C is used as the horizontal line. The intersection between lines GH and AC is determined to be at point F.

In step 715, if points E and F are determined to be the same point, then the position of the camera is directly in front of the target image. Thus, in step 720, the camera has no yaw or pitch and the process returns to FIG. 6 through connector 2. In step 715, if points E and F are determined to be at different points, then in step 725, the intersection at point I is determined from horizontal and vertical projections of points E and F. The relative position of the camera to the target image is then given by FT and EI.

In step 730, if point I is below point E, then the camera is below the target image in step 735. If in step 730, point I is not below point E, then in step 740, if point I is above point E, then the camera is above the target image in step 745. If in step 740, point I is not above point E, then the camera has no pitch in step 750. In step 755, if point F is to the left of point E, then the camera is to the left of the target image in step 760. If in step 755, point F is not to the left of point E, then in step 765, if point F is to the right of point E, then the camera is to the right of the target image in step 770. If in step 765, point F is not to the right of point E, then the camera has no yaw in step 750. The process then returns to FIG. 6 through connector 2.

In embodiments, the following is an alternative to the process in FIG. 7. For the target image of FIG. 8, the width and height of the entire red and blue blob are determined. The ratio between the width and height of the entire blob is computed. If the height of the entire blob is not less than the width, then by default the height and width are equal. Thus, the camera is directly in front of the target image, and there is no camera yaw or pitch. The process then proceeds back to FIG. 6.

If the width of the entire blob is less than the height, the camera has moved horizontally with respect to the target image on the screen. The number of pixels is counted for both the red blob on the left and the blue blob on the right. If the number of pixels in the red blob is greater than the number of pixels in the blue blob, then the camera is to the left of the target image. If the number of pixels in the blue blob is greater than the number of pixels in the red blob, then the camera is to the right of the target image. Otherwise, the camera is horizontally directly in front of the target image, and there is no camera yaw. The process then proceeds back to FIG. 6.

If the height of the entire blob is less than the width, the camera has moved vertically with respect to the target image on the screen. The entire blob is divided horizontally as close to in half as possible. The number of pixels in the top and bottom halves is counted. If the number of pixels in the top half is greater than the number of pixels in the bottom half, then the camera is above the target image. If the number of pixels of the bottom half is greater than the number of pixels of the top half, then the camera is below the target image. Otherwise, the camera is vertically directly in front of the target image, and there is no camera pitch. The process then proceeds back to FIG. 6 through connector 2.

Returning to FIG. 6 at connector 2, in step 655, if there are more camera frames to process, the process loops back to step 625. If there are no more camera frames to process in step 655, the process ends in step 690.

Other Cursor Colors and Shapes

In embodiments, the target image can be filled in with different solid colors, as well as two or more colors. Using a target image with additional colors, as in FIGS. 9A and 9B, makes estimation of three-dimensional transformations easier because more colors provide more features to be tracked. Thus, with additional colors, fewer unknowns are involved in estimating the three-dimensional position of the camera with respect to the screen.

Figure 9B:
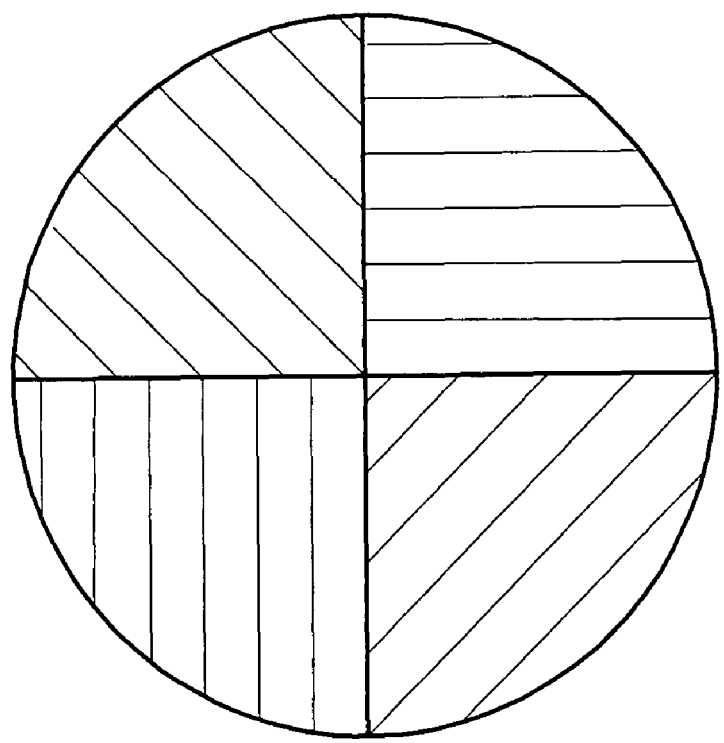
FIGS. 9A and 9B illustrate an example target image divided into four quadrants, according to embodiments of the present invention.
Figure 9A:
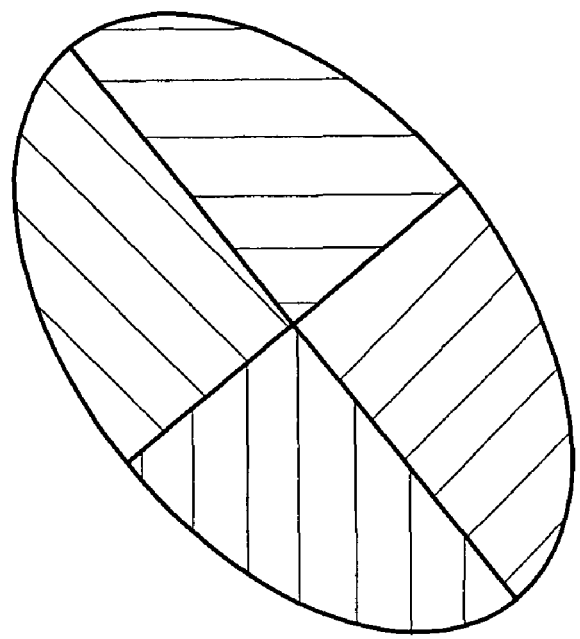

For example, FIGS. 9A and 9B illustrate an example target image divided into four quadrants, according to embodiments of the present invention. In FIG. 9B, the upper left quadrant is filled in with the color blue, shown as horizontal hatches. The upper right quadrant is filled in with brown, shown as diagonal hatches like backslashes. The lower left quadrant is filled in with green, shown as diagonal hatches like slashes. The lower right quadrant is filled in with red, shown as vertical hatches.

In embodiments, the target image can have any shape or texture. For example, checker boards can be used with different colors to estimate the parameters discussed above. Use of a circle shape for the target image, however, appears more natural to users and distracts users less, as the circle is always visible on the screen. In embodiments, a screen or multiple screens allow multiple users to each control their respective cursor, distinguished by color, shape and/or texture.

In embodiments, as the controller tracks the cursor, the controller can change the target image itself to make sure that it remains detectable. For example, the target image can be filled in with blue. If the camera moves over a blue area on the screen, the target image can instead be filled in with another color than blue.

Moving the Target Image Between Screens and Seaming Screens

Multiple screens are used in settings such as in modern conference rooms or in ad hoc meetings around a table. Each screen is controlled by one controller. Each controller can receive frames captured by multiple cameras. These controllers can be networked in some way. Each controller draws a thick edge around the screen area it controls and knows which controllers control each of the other screens.

Controllers can automatically discover in real-time the relative positions of multiple screens. Each controller determines the position of neighboring screens when a user moves a cursor across the controller's screen and crosses over the edge of the screen, as described in more detail below for FIG. 10. It is very important for controllers to register which screen is to its left, right, top, and bottom of its screen. This information is shared between controllers. This information enables the controllers to predict to which screen a user's cursor will go if it leaves the current screen, which is important for subsequent control of the screens. As a user moves a cursor to an edge of a screen, the cursor's controller knows to which controller it needs to send files regarding the cursor.

Figure 10:
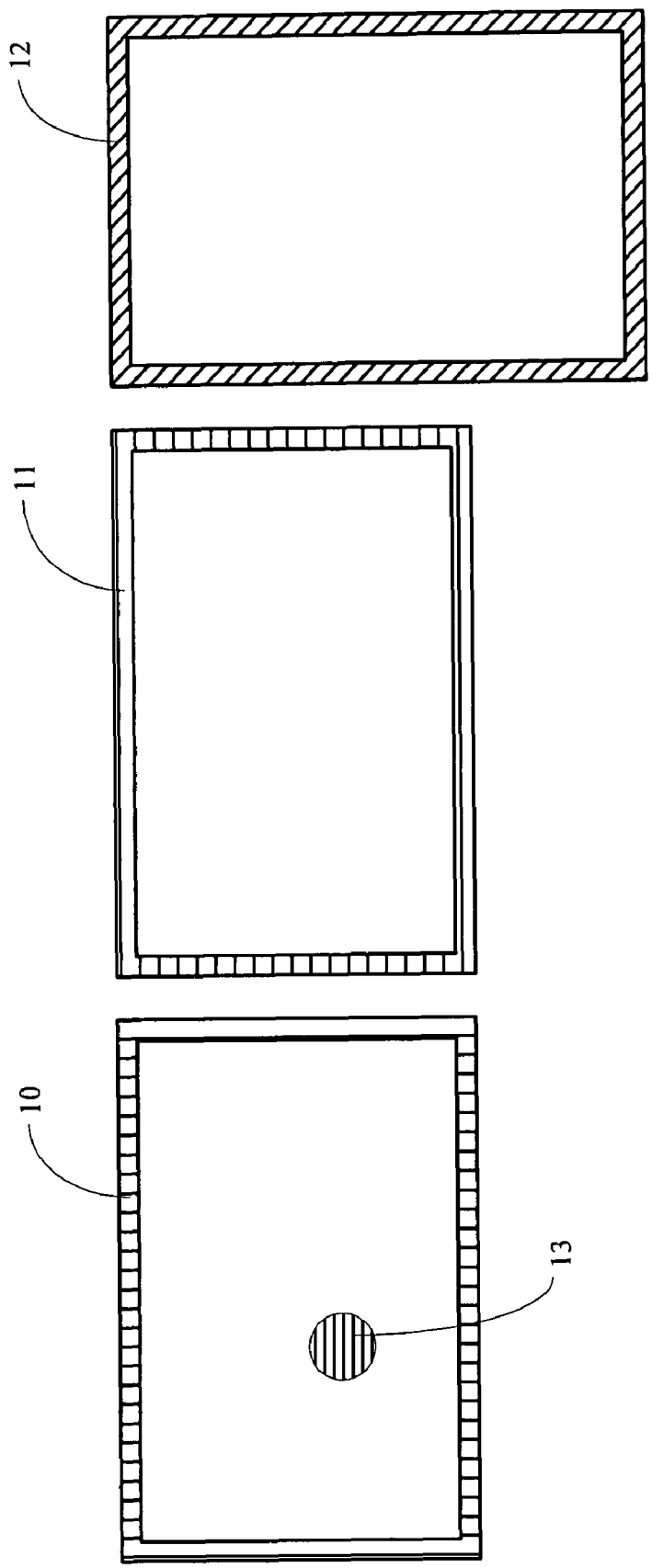
FIG. 10 illustrates three example screens controlled by three controllers, according to embodiments of the present invention.

FIG. 10 illustrates three example screens controlled by three controllers, according to embodiments of the present invention. Each controller draws a thick edge around the screen area it controls. In embodiments, the edges are in different colors and/or textures. In this example, a first controller chooses red as the thick edge around the first screen 10, where the red color of the edge is shown as vertical hatches. A second controller chooses blue as the thick edge around the second screen 11, where the blue color of the edge is shown as horizontal hatches. A third controller chooses green as the thick edge around the third screen 12, where the green edge is shown as diagonal hatches like slashes.

One controller displays and controls the target image 13. In this example, the first controller of the red screen 10 controls the target image 13. Only this controller processes the frames coming from the camera. When this controller no longer finds its blob, the controller "pings" the other controllers, and the other controllers start processing the frames from the first controller. If one of the other two controllers detects their edge in the frames, it owns the cursor and starts showing the target image on its screen. As a side effect, because the controllers are networked, the old owner of the target image and the new owner know that they are near each other and by which side they are linked. The controllers can save this information for future reference.

Manual Initial Synchronization Between Camera and Screen

In embodiments, in the simple case, the user manually synchronizes the camera and screen to initialize tracking of the target image. The controller presents the target image at a known screen location, for example at an edge or the bottom left of the screen. The user starts by aiming the camera toward this known location and zooming in or out until the controller detects the target image with a good aspect ratio. The target image's aspect ratio is the ratio of the number of pixels in the target image to the number of pixels in a frame captured by the camera. For example, an aspect ratio of fifty percent is good. In embodiments, a good aspect ratio can be any percentage. This process can be time consuming if a camera user needs to come close to the screen to initialize tracking. In embodiments, alternatively, a button on the camera could be pressed to move the target image to the center of the area viewed by the camera.

Automatic Initial Synchronization Between Camera and Screen

In alternate embodiments, a user can direct the controller to activate the automatic mode for initializing tracking, and the controller automatically brings the cursor to the area on the screen where the user is pointing the camera. In one embodiment of automatic initialization, the controller can find the camera view by rapidly presenting the target image at all screen locations until it is detected by the camera. In embodiments, the controller predicts where to move the target image for faster initialization of the tracking and less user distraction. In another embodiment of automatic initialization, the controller moves the target image only over a predefined area instead of the whole screen area, for example the edges of the screen or the bottom-left corner of the screen. This last embodiment is described in more detail below.

Figure 11:
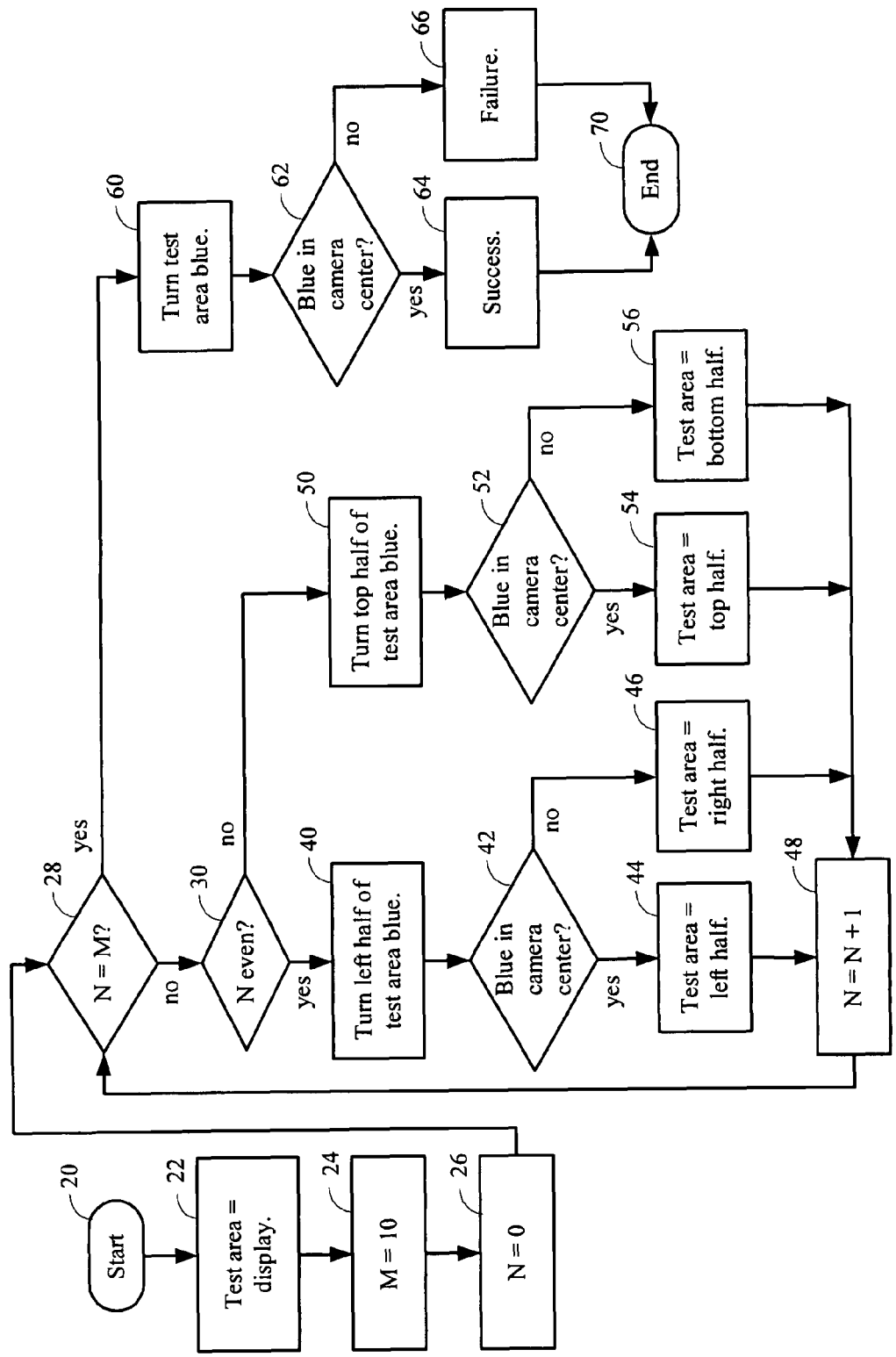
FIG. 11 shows a flow chart of an example process that automatically initializes a cursor, according to embodiments of the present invention.

FIG. 11 shows a flow chart of an example process that automatically initializes a cursor location, according to embodiments of the present invention. The controller performs this by probing progressively smaller specific regions of the screen. The probing is a binary search. FIGS. 12A-12D illustrate example screens when automatically initializing a cursor, according to embodiments of the present invention.

The screens of FIGS. 12A-12D are discussed in conjunction with the flow chart of FIG. 11.

In FIG. 11, the process starts in step 20. The test area is set equal to the screen in step 22 because at the beginning of the process, the test area is the entire screen. Later in the process, the screen is set to the size of one half of the screen. A loop limit M provides a target image initialization precision of $2^M$ based on the height and width of the screen. The loop limit M is set to ten in step 24, which provides a target image initialization precision of $2^{10}$ or 1/1024. A test is performed for each loop. Each time the test is performed, the screen is divided horizontally or vertically. The first test divides the screen into two halves, and a particular half is identified. In the second test, for a particular half identified in the first test, a half is identified within this particular half. Thus, each test decreases the height or width of the screen region by a factor of two. In other words, the area identified as the center of the camera view decreases by a factor of two every test.

A counter N is set to zero in step 26. If in step 28 the counter N does not equal the loop limit M, then if in step 30 N is even, the left half of the test area is turned blue in step 40. If in step 42 blue is found in the center of the frame sent by the camera, the controller sets the new test area to the left half of the current test area in step 44, otherwise the controller sets the new test area to the right half of the current test area in step 46. The counter N is incremented in step 48, and the process loops back to step 28.

If in step 30 the counter N is odd, then the top half of the test area is turned blue in step 50. If in step 52 blue is found in the center of the frame sent by the camera, the controller sets the new test area to the top half of the current test area in step 54, otherwise the controller sets the new test area to the bottom half of the current test area in step 56. The counter N is incremented in step 48, and the process loops back to step 28.

Figure 12C:
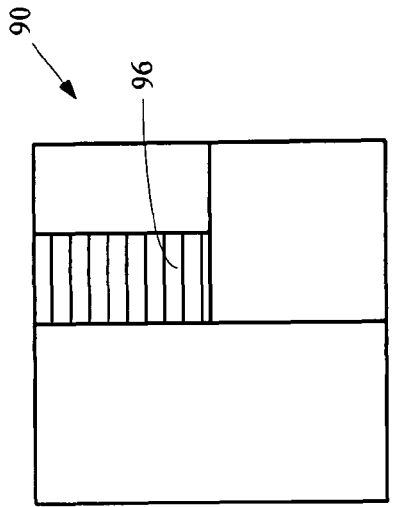
FIGS. 12A-12D illustrate example screens when automatically initializing a cursor, according to embodiments of the present invention.
Figure 12D:
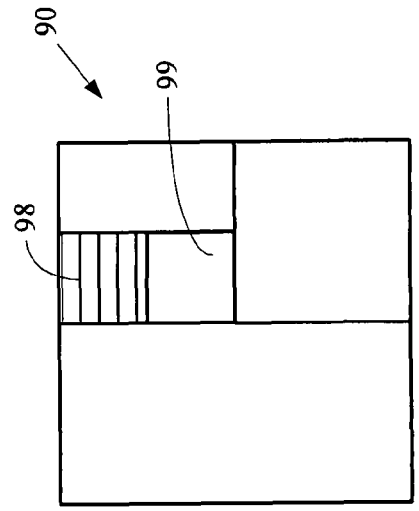
Figure 12A:
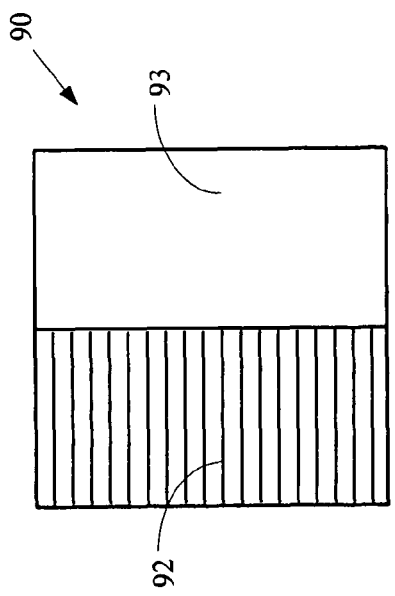
Figure 12B:
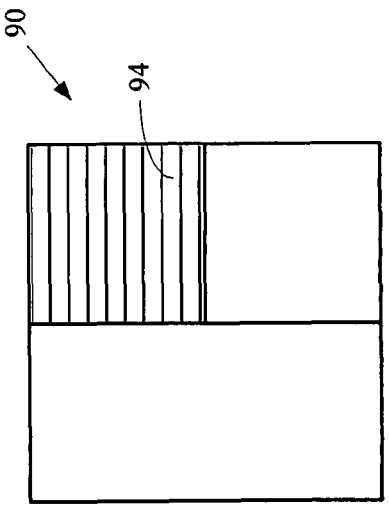

FIG. 12A shows an example screen 90 at step 40 of the first iteration when N=0 of the process in FIG. 11. In step 40, the left half 92 of the test area 90 is turned blue, as shown by the horizontal hatches in region 92. If in step 42, blue was not found in the center of the frame sent by the camera, then the new test area is set to the right half 93 of the current test area 90. FIG. 12B shows an example screen 90 at step 50 of the second iteration when N=1 of the process in FIG. 11. In step 50, the top half 94 of the test area 93 shown in FIG. 12A is turned blue, as shown by the horizontal hatches in region 94. If in step 52, blue was found in the center of the frame sent by the camera, then the new test area is set to the top half 94 of the current test area 93.

FIG. 12C shows an example screen 90 at step 40 of the third iteration when N=2 of the process of FIG. 11. In step 40, the left half 96 of the test area 94 shown in FIG. 12B is turned blue, as shown by the horizontal hatches in region 96. If in step 42, blue was not found in the center of the frame sent by the camera, then the new test area is set to the left half 96 of the current test area 94. FIG. 12D shows an example screen 90 at step 50 of the fourth iteration when N=3 of the process in FIG. 11. In step 50, the top half 98 of the test area 96 shown in FIG. 12C is turned blue, as shown by the horizontal hatches in region 94. If in step 52, blue was not found in the center of the frame sent by the camera, then the new test area is set to the bottom half 99 of the current test area 96. The new test area 99 is used as the current test area in the next iteration of the process in FIG. 11.

Returning to FIG. 11, in step 28, if the counter N equals the loop limit M after M subdivisions, then the process proceeds to a final check. In step 60, the entire current test area is turned blue to verify that the found area is in fact in the center of the camera view. If in step 62 blue was found in the center of the frame sent by the camera, the process is successful in step 64 and ends in step 70. If in step 62 blue was not found in the center of the frame sent by the camera, the process has failed in step 66 and ends in step 70.

The process of FIG. 11 can be very fast and is limited by the slowest refresh rate of the screen or camera. In a typical situation, the camera has the slowest refresh rate. For example, the camera has a refresh rate of fifteen frames per second, versus sixty or seventy frames per second for the screen. This relatively low frame rate is not a problem, since even at fifteen frames per second, the dimension of the screen can be divided in half fifteen times with the described method. This would result in a location estimate at a resolution of $2^{15}$ or $1/32768$ of the screen dimensions. This resolution is an order of magnitude higher than the native pixel resolution of a typical computer screen and therefore is more than adequate. In practice, a smaller number of subdivision steps as described in FIG. 11, and therefore a faster process, would be sufficient to achieve acceptable location precision.

In embodiments, should the camera be pointed in such a way that the target image is lost, for example by moving it too quickly to be tracked or by pointing it off of the screen, the target image needs to be reacquired by one of the methods in initialization embodiments described above.

Application Scenarios

In embodiments, in the simplest scenario, the target image is linked to a computer pointer, such as a mouse. As the user moves the target image by moving the camera, the controller moves the computer pointer.

In embodiments, because the distance of the camera relative to the screen can be estimated, the controller can also map a user's physical movements to a displayed scene. For example, a user's movements can be mapped to controlling a three dimensional environment, and the user in this case is the target image. For example, in a virtual basketball game, a user who wants to go around a virtual player has to move physically to the left or to the right. When the user physically moves to the left or to the right with respect to the screen, the controller understands that the user wants to move to the left or right in the virtual world.

In embodiments, because the distance of the camera relative to the screen can be estimated, the controller can be used to control a linear slider, such as to control volume. Other examples of a linear slider include any continuous control, such as brightness or color of an image, or any switch, such as a checkbox rendered as a toggle switch that can be flipped left-right or up-down In embodiments for drawing applications, the rotation of the camera is mapped to the rotation of a digital brush. The digital brush is displayed on the screen and rotates as the camera is rolled.

In embodiments for audio editing applications, some application "widgets" are knobs but are very difficult to use. A camera can control a knob in these types of applications by rotating the camera.

In embodiments, different distances from the camera to the display could also map to different tools. When users are close to the screen, the pointer on the screen is shown as a pen, and users can "ink" using the camera. When users are far from the screen, the pointer on the screen is shown as a brush, and users can "paint" using the camera. At even larger distances, the pointer simply controls a virtual flash-light that users can use to highlight specific areas on the screen, for example to focus the attention of their audience during a presentation.

System Hardware, Software and Components

Embodiments of the present invention can include computer-based methods and systems which can be implemented using a conventional general purpose or a specialized digital computer(s) or microprocessor(s), programmed according to the teachings of the present disclosure. Appropriate software coding can readily be prepared by programmers based on the teachings of the present disclosure. Embodiments of the present invention can include a program of instructions executable by a computer to perform any of the features presented herein.

Embodiments of the present invention can include a computer readable medium, such as a computer readable storage medium. The computer readable storage medium can have stored instructions which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, flash memory or any media or device suitable for storing instructions and/or data. The present invention can include software for controlling both the hardware of a computer, such as a general purpose/specialized computer(s) or microprocessor(s), and for enabling them to interact with a human user or other mechanism utilizing the results of the present invention. Such software may include, but is not limited to, device drivers, operating systems, execution environments/containers, user interfaces, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. It is to be understood that other embodiments of the invention can be developed and fall within the spirit and scope of the invention and claims. The embodiments were chosen and described in order to best explain the principles of the invention and its practical application, thereby enabling others of ordinary skill in the relevant arts to understand the invention for various embodiments and with various modifications that are suited to the particular use contemplated. It is intended that the scope of the invention be defined by the following claims and their equivalents.

What is claimed is:

1. A method for controlling a cursor on a screen when using a video camera as a pointing device, the method comprising:
at a computer system including one or more processors and memory storing one or more programs, the one or more processors executing the one or more programs to perform the operations of:
displaying the cursor on the screen;
receiving a respective frame captured by the video camera, wherein the respective frame includes the cursor; and
in response to receiving the respective frame, automatically, without user intervention:
detecting a size and location of the cursor in the respective frame;
moving the cursor on the screen in accordance with the detected location of the cursor in the respective frame; and
adjusting a displayed size of the cursor on the screen in accordance with the detected size of the cursor in the respective frame, wherein the adjusting includes:
increasing the displayed size of the cursor on the screen in accordance with a determination that the detected size of the cursor in the respective frame is smaller than a predefined value, and
decreasing the displayed size of the cursor on the screen in accordance with a determination that the detected size of the cursor in the respective frame is larger than the predefined value.

2. The method of claim 1, further comprising changing the display around the cursor to ensure the cursor remains detectable on the screen.

3. The method of claim 1, further comprising dynamically adjusting the size and opacity of the cursor so that the cursor remains detectable when the video camera is moved away from the screen.

4. The method of claim 1, further comprising estimating, in accordance with an appearance of the cursor in the respective frame, a distance between the video camera and the screen, the estimation used in a computation for moving the cursor.

5. The method of claim 1, further comprising estimating, in accordance with an appearance of the cursor in the respective frame, one or more of yaw, pitch, and roll of the video camera relative to the screen, the estimation used in a computation for moving the cursor.

6. The method of claim 1, further comprising manually initializing the system, after determining that a user has pointed the video camera at the cursor on the screen.

7. The method of claim 1, further comprising automatically initializing the system by displaying the cursor onto different areas of the screen until the cursor appears in a frame captured by the video camera.

8. The method of claim 1, further comprising automatically initializing the system by predicting where to move the cursor by a recursive function that determines a first quadrant of the screen that appears in a particular frame captured by the video camera, then determines a second quadrant of the first quadrant that appears in the particular frame, and so on, until the quadrant size is equal to the cursor size.

9. The method of claim 1, further comprising automatically initializing the system by displaying the cursor at a predefined area on the screen such that the cursor appears in the respective frame captured by the video camera pointed at the predefined area.

10. The method of claim 1, further comprising identifying by the computer for one or more additional screens where the screens are located in relation to each other.

11. The method of claim 10, wherein identifying where the screens are located in relation to each other further comprises determining if the video camera that points to a first screen is moved to point to a second screen, that the cursor follows from the first screen to the second screen.

12. The method of claim 1, further comprising controlling by one or more additional video cameras of their respective cursors, each cursor distinguished by one or more of color, shape, and texture.

13. A system for controlling a cursor on a screen using a video camera as a pointing device, the system comprising:
one or more processors;
memory;
one or more programs, wherein the one or more programs are stored in the memory and configured to be executed by the one or more processors, the one or more programs including instructions for:
displaying the cursor on the screen;
receiving a respective frame captured by the video camera, wherein the respective frame includes the cursor; and
in response to receiving the respective frame, automatically, without user intervention:
detecting a size and location of the cursor in the respective frame;
moving the cursor on the screen in accordance with the detected location of the cursor in the respective frame; and
adjusting a displayed size of the cursor on the screen in accordance with the detected size of the cursor in the respective frame, wherein the adjusting includes:
increasing the displayed size of the cursor on the screen in accordance with a determination that the detected size of the cursor in the respective frame is smaller than a predefined value, and
decreasing the displayed size of the cursor on the screen in accordance with a determination that the detected size of the cursor in the respective frame is larger than the predefined value.

14. The system of claim 13, further comprising instructions for changing the display around the cursor to ensure the cursor remains detectable.

15. The system of claim 13, further comprising instructions for dynamically adjusting the size and opacity of the cursor so that the cursor remains detectable when the video camera is moved away from the screen.

16. The system of claim 13, further comprising instructions for estimating, in accordance with an appearance of the cursor in the respective frame, a distance between the video camera and the screen that is used in a computation of moving the cursor, the distance used in a calculation to determine the movement of the cursor.

17. The system of claim 13, further comprising instructions for estimating, in accordance with an appearance of the cursor in the respective frame, on one or more of yaw, pitch, and roll of the video camera relative to the screen, the position used in a calculation to determine the movement of the cursor.

18. The system of claim 13, further comprising instructions for manually initializing the system, after determining that a user has pointed the video camera at the cursor.

19. The system of claim 13, further comprising instructions for automatically initializing the system by displaying the cursor onto different areas of the screen until the cursor appears in a frame captured by the video camera.

20. The system of claim 13, further comprising instructions for automatically initializing the system by predicting where to move the cursor by a recursive function that determines a first quadrant of the screen that appears in a particular frame captured by the video camera, then determines a second quadrant of the first quadrant that appears in the particular frame, and so on, until the quadrant size is equal to the cursor size.

21. The system of claim 13, further comprising instructions for automatically initializing the system by displaying the cursor at a predefined area on the screen such that the cursor appears in the respective frame captured by the video camera pointed at the predefined area.

22. The system of claim 13, further comprising one or more additional screens such that the computer identifies where the screens are located in relation to each other.

23. The system of claim 22, wherein the identification of the screen locations in relation to each other is performed if the video camera that points to a first screen is moved to point to a second screen, and the cursor follows from the first screen to the second screen.

24. The system of claim 13, further comprising one or more additional video cameras that control their respective cursors, each cursor distinguished by one or more of color, shape, and texture.

25. A non-transitory computer readable storage medium and one or more computer programs embedded therein, the one or more computer programs comprising instructions, which when executed by a computer system, cause the computer system to control a cursor on a screen using a video camera as a pointing device, comprising the steps of:

displaying the cursor on the screen;

receiving a respective frame captured by the video camera, wherein the respective frame includes the cursor; and in response to receiving the respective frame, automatically, without user intervention:

detecting a size and location of the cursor in the respective frame;

moving the cursor on the screen in accordance with the detected location of the cursor in the respective frame; and adjusting a displayed size of the cursor on the screen in accordance with the detected size of the cursor in the respective frame, wherein the adjusting includes:

increasing the displayed size of the cursor on the screen in accordance with a determination that the detected size of the cursor in the respective frame is smaller than a predefined value, and decreasing the displayed size of the cursor on the screen in accordance with a determination that the detected size of the cursor in the respective frame is larger than the predefined value.

* * * * *